Jan. 20, 1959 W. A. MASON, JR 2,869,656
CONTROL APPARATUS FOR AGRICULTURAL IMPLEMENT
Filed Oct. 18, 1954 3 Sheets-Sheet 1

FIG. I

INVENTOR.
WYLIE A. MASON Jr.
BY
ATTY.

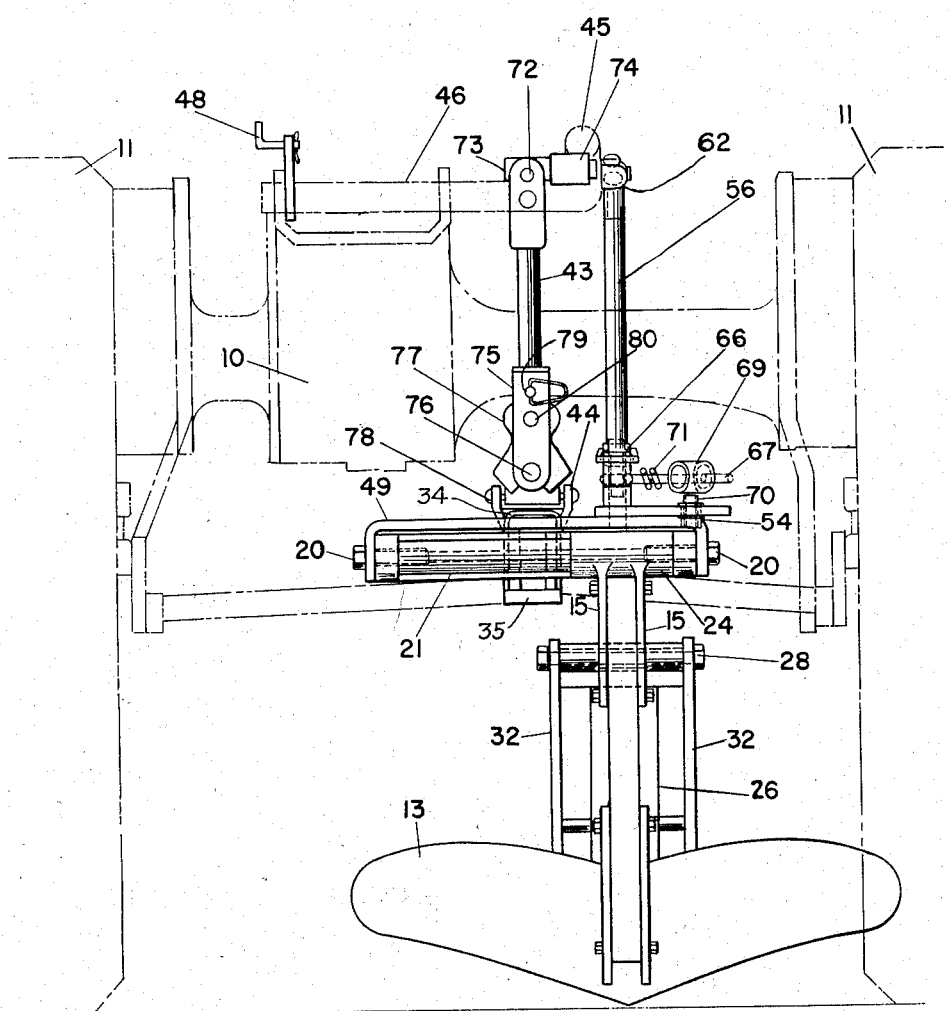
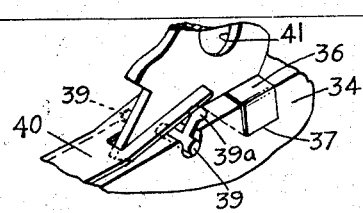
FIG. 2
FIG. 5

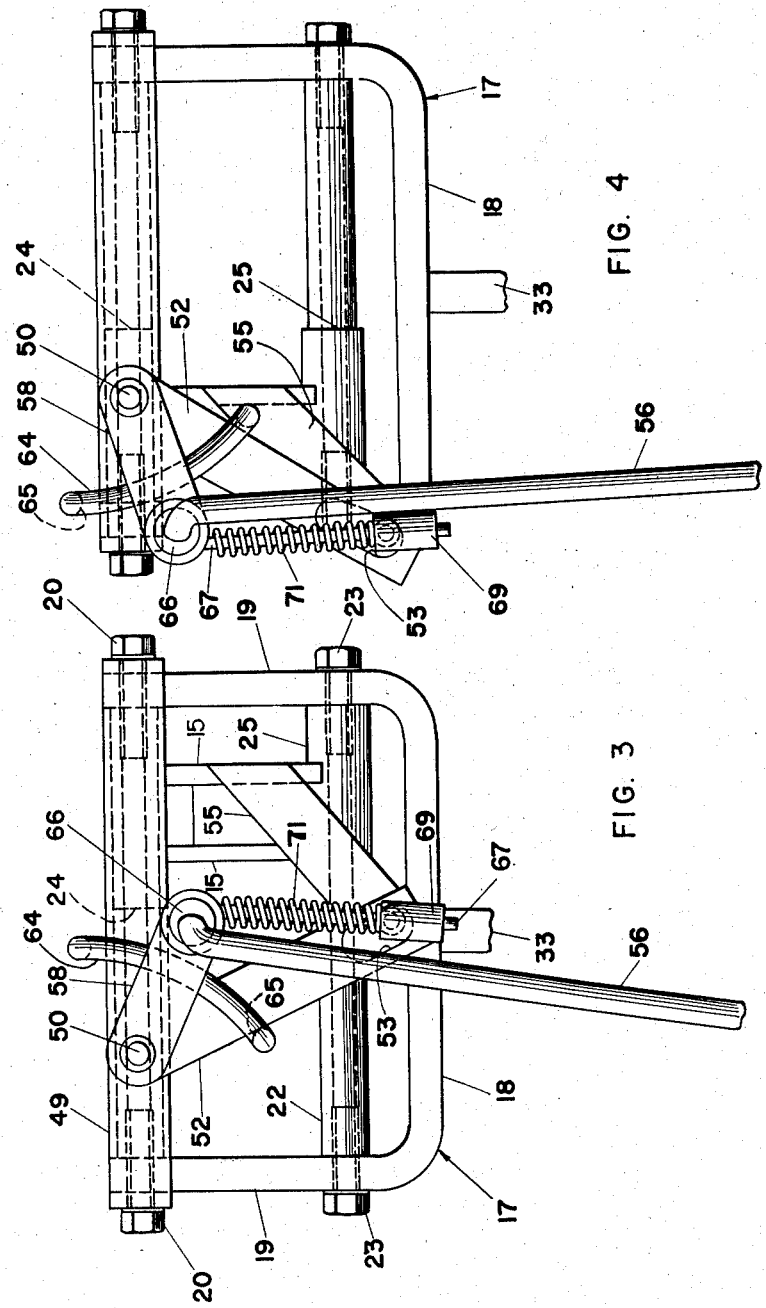
Jan. 20, 1959     W. A. MASON, JR     2,869,656
CONTROL APPARATUS FOR AGRICULTURAL IMPLEMEMT
Filed Oct. 18, 1954     3 Sheets-Sheet 3
*INVENTOR.*
WYLIE A. MASON Jr.
BY Paul O. Pippel
ATTY.

United States Patent Office 2,869,656
Patented Jan. 20, 1959

2,869,656

CONTROL APPARATUS FOR AGRICULTURAL IMPLEMENT

Wylie A. Mason, Jr., Memphis, Tenn., assignor to International Harvester Company, a corporation of New Jersey Application October 18, 1954, Serial No. 462,837

4 Claims. (Cl. 172—458)

This invention relates to agricultural implements, and particularly to tractor-mounted implements. The invention is particularly concerned with middle busters and means for controlling the operation thereof.

A middle buster is a double moldboard tillage tool used principally for breaking out the middle of previously formed ridges. Due to the spacing of traction wheels and of the ridges to be opened by the middle buster, the lateral position of the tool with respect to the spacing of the tractor wheels must be frequently changed as the tractor travels back and forth across a field. An object of the invention, therefore, is the provision of an improved tractor-mounted implement of the middle-buster type.

Another object of the invention is the provision of improved apparatus for mounting a middle buster or the like upon a tractor.

Another object of the invention is the provision in a tractor-mounted middle buster or the like, of novel shifting apparatus for laterally moving the earth-working tool to adjust its position relative to the tractor drive wheels.

Another object of the invention is the provision in a tractor-mounted implement of the middle-buster type, wherein the implement is vertically movable relative to the tractor between operating and transport positions, of means for automatically shifting the middle buster to one side or the other of a central position during the raising operation.

Other objects and advantages of the invention will become clear from the following detailed description when read in conjunction with the accompanying drawings, wherein:

Figure 2 is a rear elevation of the structure shown in Figure 1;

Figure 3 is a plan view of the middle buster shifting apparatus of this invention in one lateral position thereof;

Figure 4 is a view similar to Figure 3 showing the shifting parts in another position; and Figure 5 is an enlarged detail in perspective of a latch mechanism.

Figure 1:
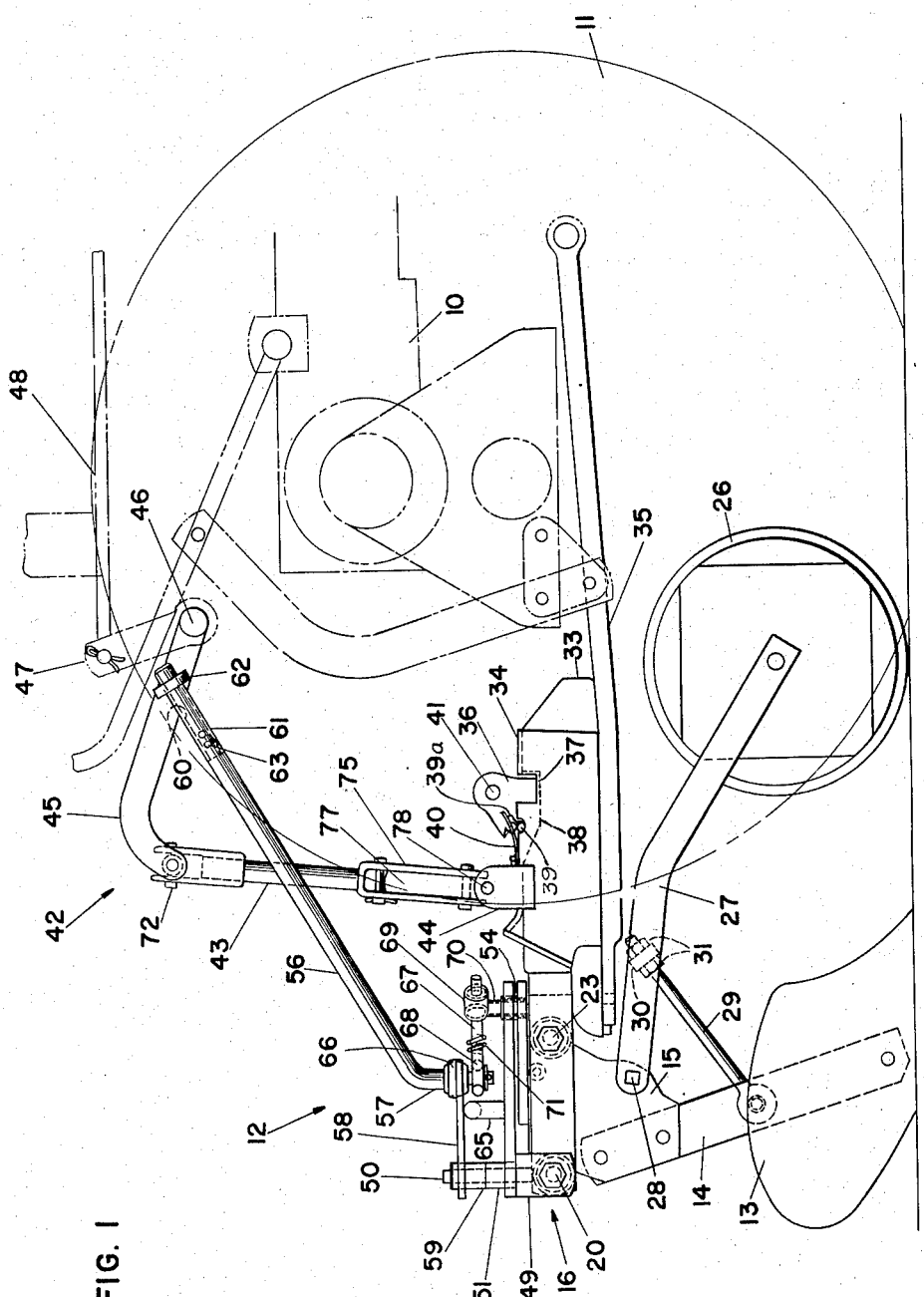
Figure 1 is a view in side elevation, diagrammatically illustrating the rear end of a tractor with a middle buster embodying the features of this invention mounted thereon.

In the drawings the numeral 10 designates the body of a tractor having laterally spaced rear drive wheels 11. The tractor is of the laterally offset body, drop-axle type, and has mounted thereupon at the rear end thereof an implement generally designated by the numeral 12 in the form of a middle buster.

The middle buster with which this invention is concerned comprises an earth-penetrating tool 13 mounted upon a generally vertically extending standard 14 affixed at its upper end to a plate 15, one such plate being provided on each side of the standard 14, affixed to and depending from a supporting frame generally designated by the numeral 16. Support 16 includes a U-shaped frame part 17 having a forward transverse portion 18 and rearwardly extending arms 19. Mounted between the rear ends of the arms 19, upon bolts 20 is a transversely extending shaft 21. Also mounted between the arms 19 and forwardly spaced from shaft 21 is another transversely extending shaft 22, parallel to shaft 21, and secured to the arms 19 by bolts 23.

Mounted upon the longitudinally spaced shafts 21 and 22 are sleeves 24 and 25, respectively. The sleeves 24 and 25 are slidable on the shafts 21 and 22, and are welded to the upper edges of the laterally spaced plates 15, so that the middle-buster bottom 13 and its standard 14 are laterally shiftable on the shafts 21 and 22 in the frame 17. Forming a part of the middle-buster assembly is a ground-engaging gauge wheel 26 mounted upon the end of a forwardly extending arm 27, pivotally mounted upon a pin 28 carried between the plates 15. The gauge wheel 26 is rigidly and adjustably held in position relative to the middle-buster bottom 13 by means of an eye-bolt 29 pivotally connected to the standard 14 and slidably received in a swivel 30 mounted upon the arm 27. The bolt 29 is threaded at its end for the reception of nuts 31 by which adjustment of the gauge wheel 26 and arm 27 with respect to the tool 13 is made. Preferably, the arm 27 comprises laterally spaced members 32 having the wheel 26 mounted therebetween.

Affixed to, as by welding, and extending forwardly from the transverse portion 18 of the frame 17, centrally thereof, is a longitudinally extending shaft member 33 adapted to be slidably received in a longitudinally elongated socket member 34, tubular in form, and affixed to the rear end of a longitudinally extending draft member 35, pivotally connected at its forward end to the body of the tractor to accommodate vertical movement of the implement 12 between operating and transport positions. The shaft member 33 is retained in the socket 34 by means of a latch 36 receivable in an opening 37 provided in the socket 34 and in a notch 38 provided in the upper edge of the shaft 33. The latch 36 is pivotally mounted by means of trunnions 39 upon the socket 34 and is yieldably held in latching position in the grooves 37 and 38 by means of a leaf spring 40 mounted upon the upper surface of the socket 34 and engaging a pin 39a, projecting from trunnion 39. An opening 41 is provided in the latch 36 to facilitate release of the latch by the tractor operator. The socket member 34 and the draft member 35 form part of the hitch structure generally designated at 42 and including a lift link 43 pivotally connected at its lower end to lugs 44 mounted upon the socket 34.

The upper end of the lift link 43 is pivotally connected to the rear end of an arm 45 mounted upon a transverse rockshaft 46 suitably mounted upon the tractor body 10 and having rock arm 47 affixed thereto. The end of arm 45 has a generally vertical component of movement during lifting of the implement, the latter swinging upwardly in a long arc about the pivot of draft members 35 on the tractor. Rock arm 47 is connected by a rod 48 to suitable power transmission means, not shown, by which the shaft 46 is rocked to vertically swing the arm 45 and raise and lower the hitch structure.

Lateral shifting of the implement 12 is accomplished by apparatus now to be described. A transversely extending bracket 49 is provided having depending legs mounted upon the bolts 20 at the rear ends of the arms 19. A pin 50 is mounted and projects upwardly from the bracket 49 and has pivotally received thereon a sleeve 51 to which is affixed one end of a shifting bar 52. The other end of bar 52 is provided with a slot 53 adapted to slidably receive a sleeve member 54 secured to a plate 55, one end of which is affixed to the spaced plates 15. At this point it should be clear that by swinging the bar 52 about its pivot on pin 50, from the position shown in Figure 3 to that of Figure 4, the plow bottom 13, standard 14 and the sleeves 24 and 25 are shifted laterally on the shafts 21 and 22 by virtue of the connection of plate 55 to bar 52 through sleeve 54.

This swinging of the shifter bar 52 from one position to the other is accomplished through the intermediary of a thrust link 56 which extends generally longitudinally and is bent downwardly at its rear end to provide a vertical portion 57 having a ball and socket universal pivotal connection with one end of a pivot link 58, the other end of which has affixed thereto a sleeve 59 mounted upon the pin 50. Thrust link or rod 56 extends forwardly and upwardly and its forward end is provided with a reduced portion 60 receivable in a sleeve 61 having a swivel 62 affixed thereto and pivotally mounted upon the arm 45, the sleeve and the reduced portion of the thrust link having registering apertures adapted to receive a pin 63. Link 56 is readily separated from sleeve 61, when the implement is to be detached from the tractor, by removing pin 63. Then upon release of the latch 36, the implement may be separated from the tractor by driving the latter away from the implement. The connection of the upper end of link 56 to arm 45 moves on a smaller arc than the connection of the lower end of the link to the implement which moves upwardly about the pivotal connection of draft member 35 to the tractor. The result is to diminish the distance during lifting between the connecting point on the implement and that on rock arm 45 at the initiation of the lifting operation.

It is desirable to laterally shift the middle-buster bottom 13 toward one or the other of the tractor drive wheels 11 when the direction of operation is reversed as when the tractor and implement are traveling back and forth across a field. In Figure 2, the middle-buster bottom 13 is shown adjacent the right-hand tractor wheel 11. In reversing the direction of operation, it will be desirable for the middle-buster bottom to be moved to a position adjacent the other tractor wheel 11 in order that the wheel may travel in an adjacent furrow and the middle-buster bottom penetrate the adjacent ridge.

With the position of the parts as shown in Figures 3 and 4, the implement has been lifted on the tractor as at the end of a field when the tractor is to be turned, and the implement propelled in the opposite direction. If we assume that the parts are in the position of Figure 3 when the turn is made at the end of the field, the implement is in position for operation adjacent the left-hand tractor drive wheel. This is the position the middle buster bottom will occupy when it is lowered. When the lift arm 45 is swung downwardly or in a counterclockwise direction, as viewed in Figure 1 to lower the implement, due to the shorter arc and therefore slower movement of the connection of rod 56 to arm 45 than the connection of the implement thereto, an increase in the distance between the connection of rod 56 to arm 45 and the connection of rod 56 to the implement through arm 58 occurs and a pulling effect will be exerted by rod 56 on link 58 to bring the latter into alignment with rod 56. An arcuately shaped bar 64 is affixed to the lower surface of link 58 and its ends are bent downwardly to form legs 65, adapted to alternately engage the bar 52 depending upon the direction of swinging of link 58. When link 58 has moved into a position approximately in line with the thrust link 56, the juncture of thrust link 56 and pivot link 58 represented by the knuckle joint 66, is forced over-center by mechanism including a rod 67 having an eye 68 at its end pivotally mounted upon the projecting end of the bent portion 57 of thrust link 56. The other end of rod 67 is slidably received in a swiveled sleeve 69 having affixed thereto and projecting therebelow a pin 70 pivotally received in the sleeve 54. A spring 71 surrounds the shank of the bolt 67 and engages the eye 68 at one end and the swivel 69 at the other end. Force is thus exerted through the spring 71 to move the connecting point 66 over-center with respect to the pivot 50 and the axis of the rod 56.

When the other end of the field is reached and the direction of travel is to be reversed, the implement is again lifted until the tractor is turned. Lifting is accomplished by swinging arm 45 in a clockwise direction, as viewed in Figure 1. Due to the longer arc of travel of the end of arm 45 than the connection of rod 56 thereto, the latter moves more slowly and rod 56 is constrained to exert a rearward pushing action against link 58 to rock it clockwise through bar 64 and laterally shift the sleeves 24 and 25 and the middle buster bottom 13 to the position of Figure 4 with the bottom ready for operation adjacent the other tractor drive wheel when the implement is lowered. When the implement is again reversed at the opposite end of the field, this procedure is likewise reversed.

To accommodate lateral tilting of the implement when one of the tractor wheels is traveling in a furrow below the level of the other tractor wheel, the connection of the upper end of link 43 to the end of rock arm 45 is by a pivot pin 72 passed through an aperture in a pin 73 carried in a sleeve 74 at the end of the arm 45. The lower end of the link 43 is provided with a clevis 75 pivotally connected by a pin 76 with a pivot block 77 pivotally mounted upon a bolt 78 carried by the lugs 44. Optionally, lateral swinging may be prevented by the provision of a pin 79 which may be placed in an opening 80 registering with a suitable opening in the pivot block 77.

It will be observed that a novel automatic shifting apparatus has been provided for laterally moving a tractor-mounted middle buster in response to raising and lowering of the implement. It should likewise be understood that the invention has been described in its preferred embodiment only, and that modifications may be made therein without departing from the spirit of the invention or the scope of the appended claims.

What is claimed is:

1. The combination with a tractor of an implement connected to the tractor in draft-receiving relation for vertical movement relative thereto between operating and transport positions, comprising a tool-supporting frame, a tool mounted on said frame for lateral shifting relative thereto in a substantially straight line between two positions, lift means on the tractor, linkage connecting said lift means to the implement for raising and lowering the latter, motion transmitting means carried by said frame and operatively connected to said tool to laterally shift the latter upon actuation of said motion transmitting means, said motion transmitting means comprising a horizontal link pivotally mounted on said frame, means operatively connecting said link to said tool for shifting the latter in opposite directions in response to swinging said link in opposite directions, and a longitudinally movable actuating member pivotally connected between said lift means and said link and adapted to exert thrust rearwardly for shifting the latter and said tool upon operation of said lift means to raise the implement, the spacing between the connection of the actuating member to the lift means and the connection thereof to the implement through said link at the initiation of the lifting operation being decreased during lifting of the implement to effect said rearward thrust.

2. The invention set forth in claim 1, wherein lost motion is provided in the connection of said link to said tool to accommodate limited swinging of said link prior to shifting said tool.

3. The invention set forth in claim 2, wherein spring means is anchored to said tool and to the pivoted connection of the actuating member to said link, and operable to alternately bias said link in opposite directions to an overcenter position with respect to said actuating member.

4. The combination with a tractor of an implement connected to the tractor in draft-receiving relation for vertical movement relative thereto between operating and transport positions, comprising a tool-supporting frame, a tool mounted on said supporting frame for movement relative thereto between two positions, motion transmitting means carried by the frame and operatively connected to said tool for effecting said movement between positions corresponding to operating and transport positions of the implement, lift linkage connecting said lift means to the implement for vertically moving the latter upon movement of the lift means, and an actuating member connecting said lift means to said motion transmitting means for effecting movement of the tool relative to said supporting frame in response to movement of the lift means, the connection of said actuating member to said lift means and the connection thereof to the implement through said motion transmitting means at the initiation of a lifting operation being movable at different rates during vertical movement of the implement, diminishing the distance therebetween and causing thrust to be exerted by the actuating member against said motion transmitting means.

References Cited in the file of this patent

UNITED STATES PATENTS

| | | |
|---|---|---|
| 2,159,669 | Morkoski | May 23, 1939 |
| 2,341,179 | Hipple | Feb. 8, 1941 |
| 2,351,473 | Benjamin | June 13, 1944 |
| 2,354,886 | Silver | Aug. 1, 1944 |
| 2,543,786 | Lindeman | Mar. 6, 1951 |
| 2,578,942 | Onfrey | Dec. 18, 1951 |
| 2,620,715 | Silver et al. | Dec. 9, 1952 |
| 2,672,800 | Mellen | Mar. 23, 1954 |
| 2,712,276 | Cahow et al. | July 5, 1955 |
| 2,724,313 | Jennings | Nov. 22, 1955 |
| 2,732,782 | Gurries et al. | Jan. 31, 1956 |

FOREIGN PATENTS

| | | |
|---|---|---|
| 681,856 | Great Britain | Oct. 29, 1952 |